Figure 1:
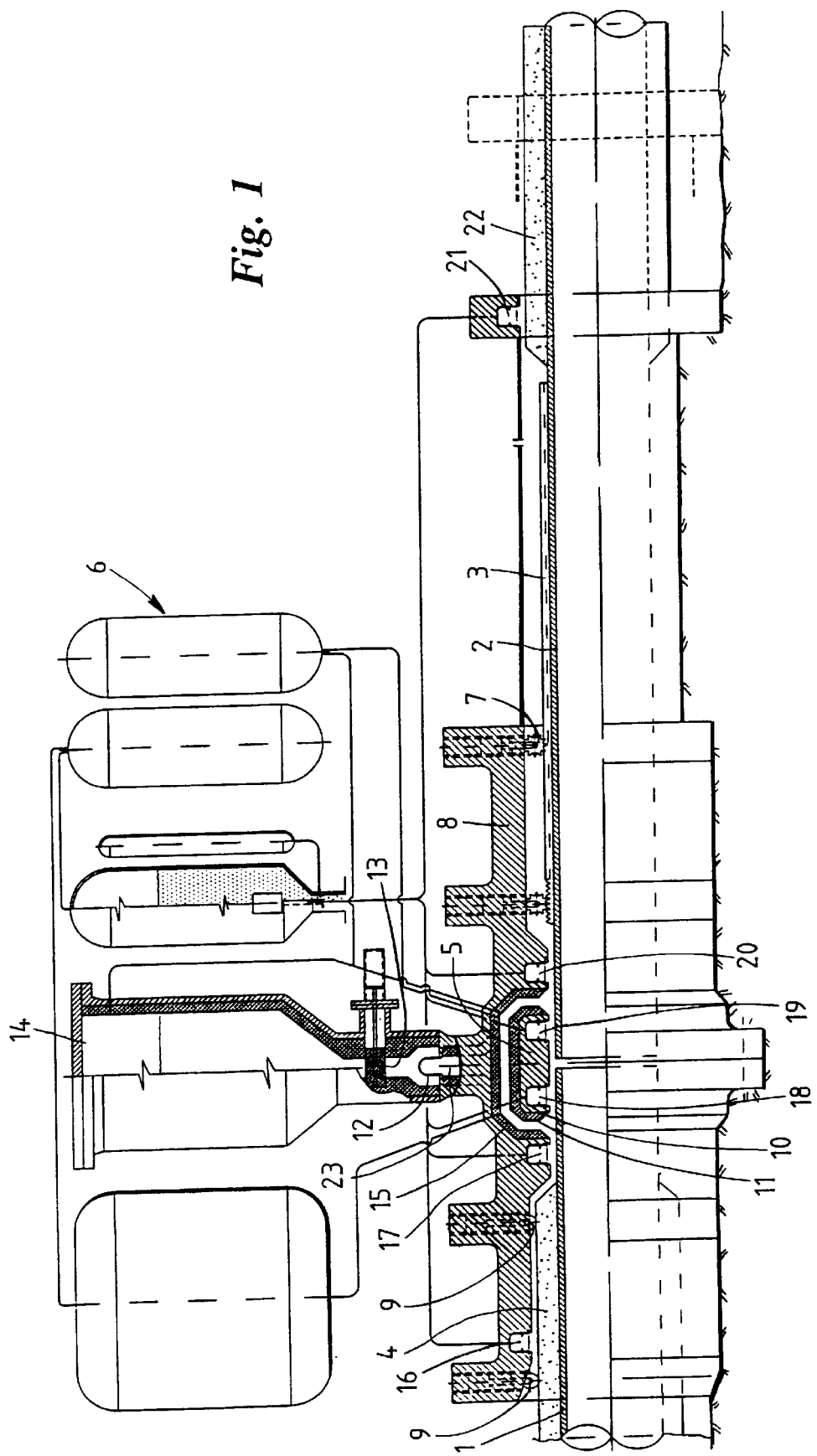

United States Patent
Hagen

[11] Patent Number: 6,131,801
[45] Date of Patent: Oct. 17, 2000

[54] METHOD AND DEVICE FOR THERMITE WELDING AT LARGE WATER DEPTHS

[76] Inventor: Nils Chr. Hagen, Ravnedalsveien 12, N-4616 Kristainsand, Norway

[21] Appl. No.: 09/155,964

[22] PCT Filed: Apr. 8, 1997

[86] PCT No.: PCT/NO97/00091

§ 371 Date: Feb. 22, 1999

§ 102(e) Date: Feb. 22, 1999

[87] PCT Pub. No.: WO97/37806

PCT Pub. Date: Oct. 16, 1997

[30] Foreign Application Priority Data

Apr. 9, 1996 [NO] Norway ..................................... 961394

[51] Int. Cl.[7] ........................... B23K 37/00; B23K 31/02; C21B 15/00
[52] U.S. Cl. ..................... 228/234.3; 228/241; 228/44.3; 266/167
[58] Field of Search ................................ 228/234.3, 241; 266/167

[56] References Cited

U.S. PATENT DOCUMENTS

| | | |
|---|---|---|
| 1,549,511 | 8/1925 | Schultz . |
| 1,880,242 | 10/1932 | Dickson . |
| 2,408,291 | 9/1946 | Cadwell ....................................... 75/27 |
| 3,578,233 | 5/1971 | Meister et al. ............................... 228/5 |
| 3,684,003 | 8/1972 | Funk ........................................ 164/362 |
| 3,948,434 | 4/1976 | Rothchild ................................. 228/241 |
| 4,062,485 | 12/1977 | Andersen ................................... 228/56 |
| 4,063,720 | 12/1977 | Boutet et al. ............................ 266/167 |
| 4,729,503 | 3/1988 | Niinvaara ................................... 228/18 |
| 4,881,677 | 11/1989 | Amos et al. ............................... 228/33 |
| 5,145,106 | 9/1992 | Moore et al. ............................. 228/241 |
| 5,171,378 | 12/1992 | Kovarik et al. ........................... 148/24 |
| 5,340,014 | 8/1994 | Sekhar et al. ............................ 228/198 |
| 5,660,317 | 8/1997 | Singer et al. ........................... 228/44.3 |
| 5,961,027 | 10/1999 | Szecket ................................... 228/107 |

*Primary Examiner*—Patrick Ryan
*Assistant Examiner*—Lynne Edmondson
*Attorney, Agent, or Firm*—Marshall, O'Toole, Gerstein, Murray & Borun

[57] ABSTRACT

Method and device to join the ends of two cylindrical objects by welding at deep water without the use of divers, where the ends of the two objects are connected with an inner casing inside an outer casing thereby creating a closed chamber around the joint between the inner and outer casings, evacuating the chamber and initiating a thermite welding process, the closed chamber thereby being filled with metal and establishing a mould sealingly connected with the outer surface of the two objects and abridging the distance between the two objects.

6 Claims, 2 Drawing Sheets

METHOD AND DEVICE FOR THERMITE WELDING AT LARGE WATER DEPTHS

The present invention is related to a method and a device for underwater welding of joints with two bodies having substantially cylindrical cross section, such as pipes.

By new installations and repairs of steel pipelines at large depths from time to time the need arises to connect the ends of two pipes. As of today the most used solutions for this operation is butt welding performed by divers working in a welding chamber or welding habitat which has to be established around the pipe joint. Today diving is allowed to 360 m in emergency situations, however not more than 180 m is preferred. It is expected that limiting restrictions will be adapted to diving in the future.

Mechanical and hydraulic couplings also are used to seal pipe joints without welding. Such couplings may be installed without the use of divers, however huge installation frames are needed to adjust the pipes and move the couplings on the ends of the pipes.

Common for the two above mentioned methods, however, is that the ends of the pipes have to be very exactly adjusted to each other as to diameter, circularity, length and deviation from alignment.

With the method and the device according to the present invention, a possibility is provided for safe, secure and simple welding of pipe ends at large water depths without use of divers. With the present invention the tolerances for the adjustment of the ends of the pipes are increased substantially as related to the above mentioned known methods. Even a certain angle in the pipeline may be accepted.

With the present invention, sealing of a pipe joint may be achieved in a short time in relation to known methods and the invention is highly adaptable and advantageous when laying new pipes as well as repairs of existing pipes under water.

The above mentioned restrictions and disadvantages connected with known pipeline joint solutions are avoided with the method and the device according to the present invention, as defined by the features stated in the patent claims.

The device according to the present invention comprises a compact welding chamber covering the pipe joint and being adapted for thermite welding by creation of a muff or ring sealingly connecting the two pipes.

Thermite welding as such is a well known technology used extensively for welding of railroad rails and power lines. With the present invention, the thermite technology is used to weld pipe joints under water remotely controlled.

The device according to the present invention is specially designed to fulfil the requirements for the method and comprises a joint casing as well as equipment being connected with the casing during the welding operation as well as the operations necessary before the welding itself may start. Several standard components are included in the hydraulic system which will not be described in detail, as will not be the equipment for injection of cement and possibly equipment adapted for releasing of the equipment, thereby preparing some of the equipment for reuse. Furthermore standard equipment is assumed available comprising a support vessel with crane capacities of at least 25 tons, heave-compensated. A remote operated vehicle is necessary for performing the cutting work and observations by means of TV-cameras. Electric power is supplied for heating and operation of hydraulic pumps as well as for operation controls. Nitrogen is used in the sense of a protection gas mixture without oxygen to be adapted to the specific project depending on the water pressure and other circumstances on site.

Figure 2:
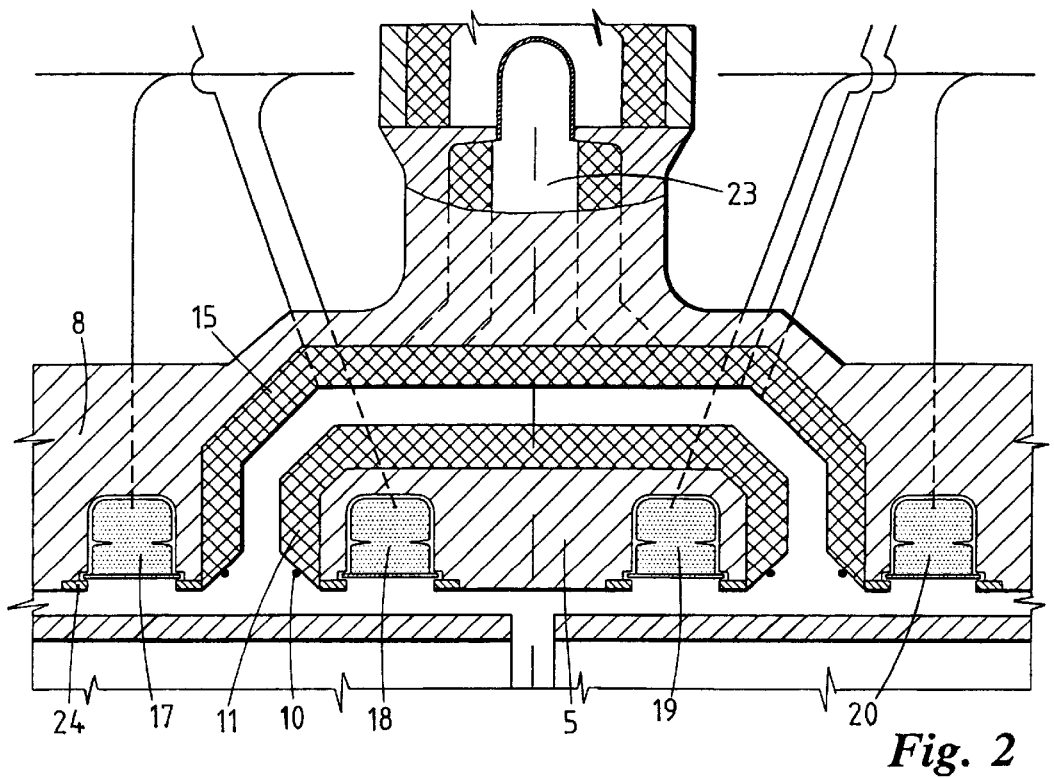
Figure 3:
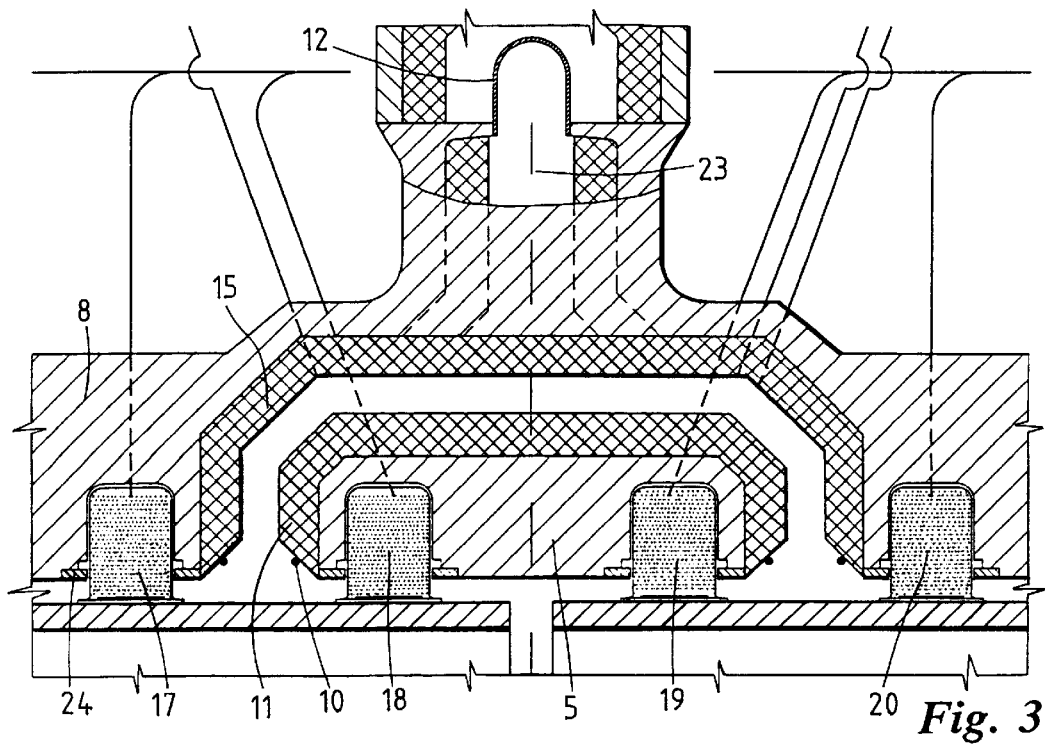

FIG. 1 discloses a longitudinal section through the two pipes 1 and 2 which are to be connected by a seal proof joint, using the method and welding device according to the present invention and FIGS. 2 and 3 disclose enlarged the sealing ring in respectively an preoperational and an operative state.

The welding chamber consists of an outer connecting casing 8 and an inner connecting casing 5, with outer refractory lining 11 and inner refractory lining 15 and sealing rings 16, 17, 18, 19, 20 and 21. The inner casing 5 is permanently connected to the outer casing 8 by stiff connecting bars not shown in FIG. 1. In order to get the inner casing 5 into the outer casing 8, casing 8 is made of two parts which are bolted together and thereafter welded to be gas tight.

The present invention is adapted for use in connection with replacement of a short length of an existing pipeline. In such a case two joints made according to the present invention, are needed. In other cases longer lengths of the pipeline is to be replaced or a new pipeline is to be laid. Then it may be suitable to use the present invention for only one joint, whereas the other joint is connected on board a ship or in shallow water by other methods.

FIG. 1 discloses only one joint, such as a case where a damaged portion of a pipe is removed in a length of at least 12 m by means of a remote operated vehicle (ROV). The end of pipe 1 is lifted approximately 0.3 m and cut to be plane. The inner and outer edges are rounded to ensure smooth and safe operation is of the equipment which is to be guided through the pipeline in the future for maintenance reasons.

The concrete mantle 4 is removed approximately 0.6 m from the ends of the pipe. The circumference on the free ends are brushed with steel brushes. The distance and the angle between the ends of the pipes are to be measured.

On a support vessel a pipe section 2 with the correct length is prepared. The concrete mantle 22 on the section should be removed approximately 3.5 m at each end. The circumference on the free ends are sand blasted approximately 0.6 m from each end. Toothed bars 3 are welded in the longitudinal direction of the pipe approximately 0.7 m from each end. Welding chambers are arranged on each pipe end. All equipment such as hydraulic pumps, cylinders, valves as well as pipes, hoses, sealings, water tank, nitrogen containers, concrete mixers and a crucible 14 should be secured in advance to the connecting casings 8 and tested functionally. Containers 6 are disclosed generally in FIG. 1. The casings 5 and 8 are to be tested by running them in both directions by means of hydraulic drive wheels 7 and the toothed bar 3. Thereafter the casings 5 and 8 are placed in such a way that the ends of the pipe 2 are visible outside the casing 8. A mixture of iron oxide and aluminum powder, socalled thermite, is filled into the crucible 14. The mixture also can contain certain additives to establish a steel quality corresponding with the steel to be welded. The crucible 14 is sealed and evacuated approximately to a vacuum.

The pipe 2 with the equipment is lowered to the seabed and arranged between existing pipes 1. A clearance up to 100 mm may exist between the new and existing pipe and it is an advantage that the pipes are arranged in a slight curve in the horizontal plane before the joint is connected. This will allow for shrinkage due to the welding process and avoids stress in the pipeline. Guiding wheels 9 and driving wheels 7 are activated hydraulically and move the casings 8 on to the existing pipe 1. The casings 8 are centering the pipes by means of the guiding wheels 9. Circumferentially between the guiding wheels are arranged hydraulically operated pins (not disclosed) maintaining the position of the pipes in the casing 8. With a ROV it has to be ensured that material from the seabed has not entered the interspace between the pipe and the casing 5 and 8, which possibly has to be flushed out.

Pretensioned rubber sealing rings 16, 17, 18, 19, 20 and 21 are filled with special sand at vacuum pressures, see FIG. 2. Said rings are activated by injecting special mortar in each ring. When the internal vacuum is replaced by an injection pressure which is somewhat higher than the outer water pressure, the part of the sealing ring closest to the pipe will be pressed out between the retainer rings 24. The pretensioning will thereafter cause the part closest to the pipe to be drawn towards the pipe in the same way as an elastic band, see FIG. 3. The internal volume in each ring is automatically supplied with special mortar.

The volume to be filled with steel is now established, defined by the sealing rings 17 and 20 and the outer refractory lining 15 on the outer casing 8, the inner refractory lining 11 and the sealing rings 18 and 19 on the inner casing 5, and the outer surface of the pipes 1 and 2. The volume is however still filled with salt water at the same pressure as the surrounding water pressure. The salt water is evacuated by filling the volume with nitrogen at somewhat higher pressure than the external water pressure. This has to be made carefully, thereby avoiding leakages through the sealing rings.

The volume thereafter is flushed with water from the fresh water tank and using nitrogen as a driving gas. The flush water should have somewhat higher pressure than the outside water pressure to avoid risk that salt water is leaking through the sealing rings.

The fresh water is evacuated from the volume by filling it with nitrogen with a somewhat higher pressure than the outside water pressure. Heating threads 10 on the inner and outer refractory linings 11 and 15 are activated and the contact surface of the pipes thereby being preheated. The injection mortar is hardened and the last remnants of water is evaporated. Nitrogen saturated with water is replaced by new and dry nitrogen. The heating continuously has to be surveyed, avoiding that the pressure exceeds one atmosphere above the outside water pressure. As preheating is performed in an oxygen free atmosphere, a relatively high temperature may be achieved without damaging the rubber in the sealing rings.

The thermite is ignited within the crucible 14 approximately at vacuum. Preheating of part of the thermite by means of a thermal element (not disclosed) may be required before ignition. The heat development and the creation of slag will lead to a certain increase in pressure. When the reaction is finished, the pressure within the crucible shall be equalized to the external water pressure by adding nitrogen or letting gas out. The reaction in the crucible provides a steel temperature of above 2,400° C. The ideal moulding temperature is depending also on the relationship between the volume to be moulded and the contact area and should be calculated for each single case by FE-analyzes. It is assumed that in most cases it will be lower than 1,800° C. Therefore the operation has to be delayed until the ideal temperature is achieved. Just before the temperature is correct, the pressure in the volume to be moulded and also in the crucible 14, should be adjusted to be equal to or slightly higher than the external water pressure. Of this reason there exists a connection system comprising valves between the volume to be moulded, the crucible 14 and the nitrogen containers.

The plug 13 is opened for the steel which is flowing down to the sealing 12, melting the sealing and continuing through the connecting pipe 23 to the volume to be moulded, thereby connecting to the outer surfaces of pipes 1 and 2. The rubber walls in the sealings 17, 18, 19 and 20 carbonize in the contact surface with the flowing steel, whereas the internal, stabilized mass of sand and special mortar will create a barrier to the water until setting is completed. Carbonizing of the rubber is assumed to give a minor unimportant pollution in the outer surface of the steel. After the steel has set it will still be cooling and contracting. The new welded ring will be shrinked to the pipe and large radial pressure stress will be created in the surface between the ring and the pipe. This pressure withholds creation of cracks and ensure a gas tight connection.

The iron oxide inside the crucible 14 is replaced from 0 to 100% by other metal oxides or pure metals, thereby however maintaining a reduction process similar to the thermite process.

Cooling of the steel also means that the pipe will shrink in the longitudinal direction. If the pipes in advance create a shallow curve, no tensile stress will be created in the longitudinal direction. If the pipes are completely linear such tensile stresses may occur, depending on the friction between the pipe and the seabed.

Within the outer sealing rings 16 and 21 there now will exist two volumes with seawater permanently sealed and which therefore will not be of any danger as to corrosion. Further corrosion protection and secondary sealing of the pipe joint can be achieved with injection of cement mortar in volumes filled with seawater.

The casings as well as all equipment may be left on the seabed, it is however a possibility to take up to the surface the water tank, the mixing battery, the pressure equalizing system, the crucible and hydraulic pumps if such parts are connected to one unit which can be released from the casings 8 and taken up to the surface.

Simplicity and reliability of the method makes it impossible to test the weld with conventional methods. It also is not possible to correct possible errors. It is presumed therefore that the level of quality for the device as well as for the method is established with a full scale prototype and tests in advance. The cross section of the weld may be overdimensioned in relation to the thickness of the pipe wall to ensure that relatively large defects may have no importance. Additionally a secondary seal may be established by injecting mortar into the volume between the wall of the pipe and the casing 8.

Further FE-analysis may show that the inner refractory lining 11 may be omitted.

Two pipes having two alignment routes at an angle to s each other also may be welded together with the method according to the present invention. The angle between the pipelines may be in a vertical or horizontal plane or in a combined plane.

Likewise may pipes be welded together having different outer diameters, the casing 8 having a corresponding shape. Furthermore the pipes need not rest on a horizontal surface, e.g. the thermite welding process may also be utilized in cases where one or both pipes rests on an inclined underground, or if two pipes are standing free in the water.

The method according to the present invention is not limited to welding of pipes, but can also be used for welding joints of solid cylindrical bodies.

What is claimed is:

1. A method of joining the ends of two cylindrical objects by welding at deep water without the use of divers, comprising the steps of connecting the ends of the two objects with an inner casing inside an outer casing thereby creating a closed chamber around the joint between the inner and outer casings, evacuating the chamber and initiating a thermite welding process comprising the reaction of iron oxide and aluminum powder, the closed chamber thereby being filled with metal and establishing a mold sealingly connected with the outer surface of the two objects and abridging the distance between the two objects.

2. The method according to claim 1 wherein said iron oxide is replaced by other metal oxides or pure metals to an extent of from 0 to 100%, thereby however maintaining a reduction process similar to the thermite process.

3. A device adapted to join the ends of two cylindrical objects by welding at deep water comprising an inner casing, an outer casing, interior sealings in the outer casing, interior sealings in the inner casing, the sealings being adapted to clamp around the exterior of the two objects to be joined, the device further comprising a crucible containing a mixture of iron oxide and aluminum powder which after operation fills the volume between the inner and outer casings and the sealings completely with metal.

4. The device according to claim 3 where the outside of the inner casing and the inside of the outer casing comprise refractory linings against the volume to be filled with steel.

5. The device according to claim 3 wherein the crucible is closed by a plug and a seal, the seal withstanding the water pressure but melting when the plug (13) is opened.

6. The device according to claim 3 wherein the sealings comprise rubber tori containing special refractory sand at vacuum and pretensioned to be held in place by retainer rings and to be clamped around the two objects by increasing the interior pressure and supplying the increased volume by injecting sand and mortar from an external source.

* * * * *